United States Patent
Hsieh

(10) Patent No.: US 10,954,146 B2
(45) Date of Patent: Mar. 23, 2021

(54) COMBINATION OF TRICKLING FILTER AND AERATION TANK OF WASTEWATER TREATMENT SYSTEM

(71) Applicant: KUAN YUAN PAPER MFG. CO., LTD., Miaoli (TW)

(72) Inventor: Kuang Yuan Hsieh, Miaoli (TW)

(73) Assignee: KUAN YUAN PAPER MFG. CO., LTD., Zhunan Township (TW)

( * ) Notice: Subject to any disclaimer, the term of this patent is extended or adjusted under 35 U.S.C. 154(b) by 0 days.

(21) Appl. No.: 16/831,743

(22) Filed: Mar. 26, 2020

(65) Prior Publication Data
US 2020/0308033 A1    Oct. 1, 2020

(30) Foreign Application Priority Data
Mar. 29, 2019   (TW) .................................. 108111137

(51) Int. Cl.
C02F 3/04        (2006.01)
C02F 3/14        (2006.01)
C02F 3/10        (2006.01)

(52) U.S. Cl.
CPC ................ C02F 3/04 (2013.01); C02F 3/101 (2013.01); C02F 3/14 (2013.01)

(58) Field of Classification Search
CPC .............. C02F 3/04; C02F 3/101; C02F 3/10
USPC .................................................. 210/150, 615
See application file for complete search history.

(56) References Cited

U.S. PATENT DOCUMENTS

| | | | | |
|---|---|---|---|---|
| 2,388,795 A * | 11/1945 | Montgomery | ............ | C02F 3/04 210/617 |
| 3,231,490 A * | 1/1966 | Fry | .......................... | C02F 3/103 210/615 |
| 3,496,101 A * | 2/1970 | Hay | ......................... | C02F 3/101 210/615 |
| 3,876,542 A * | 4/1975 | Carlson | .................... | C02F 3/101 210/150 |
| 6,187,183 B1 * | 2/2001 | Weaver | .................... | C02F 3/288 210/150 |
| 7,067,055 B2 * | 6/2006 | Ruppel | ..................... | C02F 3/04 210/85 |

(Continued)

FOREIGN PATENT DOCUMENTS

| | | |
|---|---|---|
| CN | 101045575 A | 10/2007 |
| CN | 101767862 A | 7/2010 |
| TW | M307621 | 8/1995 |

OTHER PUBLICATIONS

Office Action and Search Report of corresponding TW application 108111137, published on Nov. 12, 2019.

(Continued)

*Primary Examiner* — Claire A Norris
(74) *Attorney, Agent, or Firm* — Wang Law Firm, Inc.

(57) ABSTRACT

A wastewater treatment system includes an aeration tank under a plurality of trickling filters to receive wastewater from the trickling filters. A plurality of bacteria culture modules are received in each trickling filters. A plurality of blower devices and air pipes are provided to generate ventilation to cool the wastewater flowing out of the bacteria culture modules. Each of the bacteria culture modules has a cage in which a plurality of culture woods are vertically received. Therefore, a temperature of the wastewater is reduced to form an environment which is good to the bacteria.

4 Claims, 7 Drawing Sheets

(56) References Cited

U.S. PATENT DOCUMENTS

| | | | |
|---|---|---|---|
| 7,238,286 B2* | 7/2007 | Dunn | C02F 3/043 210/617 |
| 2011/0303589 A1* | 12/2011 | Kuennen | C02F 1/281 210/95 |
| 2012/0125841 A1* | 5/2012 | Webb | C02F 3/04 210/631 |

OTHER PUBLICATIONS

Notice of Allowance of corresponding TW application 108111137, published on Mar. 16, 2020.

* cited by examiner

COMBINATION OF TRICKLING FILTER AND AERATION TANK OF WASTEWATER TREATMENT SYSTEM

BACKGROUND OF THE INVENTION

1. Technical Field

The present invention relates to a wastewater treatment system, and more particularly to a combination of a trickling filter and an aeration tank of a wastewater treatment system.

2. Description of Related Art

Biological process is widely used in wastewater treatment since no chemical solution is needed in the process. However, it still has some drawbacks, including a large amount of sludge is generated and accumulated on the filters, tanks and pipes, which will reduce the efficiency of treatment and a bad environment for bacteria, such as high temperature and low dissolved oxygen in the wastewater.

Treatments of wastewater in paper recycling including coagulation process, biochemical process, and chemical process. Bacteria, such as anaerobic bacteria and aerobic bacteria, are used in biochemical process. Environment is deeply effects the works of bacteria, such as temperature and pH value of water. Typically, high temperature is bad for bacteria, and water temperature always increases in wastewater treatment. A conventional solution is adding chemical solution to help the works of bacteria instead of lowering the temperature. It has limited effect only.

Taiwan Utility Model no. M307621 disclosed a biochemical wastewater treatment equipment, including a stirring tank, a first quick sedimentation tank, a bacteria culture tank, a biologically fluidized tank, a second quick sedimentation tank, a sterilization tank, and an emission tank. The bacteria culture tank, which is connected to the first quick sedimentation tank, includes a container, in which several culture frames and several air pipes are provided. The biologically fluidized tank, which is connected to the bacteria culture tank, includes several reactor containers, a conveying container, and an oxygen supply unit. The reactor containers are connected in series, the oxygen supply unit is connected to one of the reactor containers, the conveying container is connected to the oxygen supply unit, and the second quick sedimentation tank is connected to the conveying container. Bacteria in the bacteria culture tank and the biologically fluidized tank are used to clean wastewater.

The prior art provided the oxygen supply unit above the biologically fluidized tank to flow the wastewater through the oxygen supply unit and then fall into the biologically fluidized tank. With this arrangement, the temperature of the wastewater is high and the dissolved oxygen in the wastewater low. This is bad for the bacteria.

BRIEF SUMMARY OF THE INVENTION

In view of the above, the primary objective of the present invention is to provide a regulating tank, which may lower water temperature to provide an environment which is good for the bacteria.

In order to achieve the objective of the present invention, a wastewater treatment system includes a trickling filter having two first sidewalls, two second sidewalls, and a bottom wall connected to the first sidewalls and the second sidewalls, wherein a chamber is form above the bottom wall, and the bottom wall is provided with an opening; a plurality of bacteria culture modules received in the chamber of the trickling filter; a blower device provided on the first sidewall of the trickling filter, wherein the blower device has an output terminal which is below the bottom wall of the trickling filter; an air pipe provided on the second sidewall of the trickling filter, wherein the air pipe has an inlet communicated with a room under the bottom wall; and an aeration tank under the trickling filter.

In an embodiment, the trickling filter is provided with a window on the second sidewall and below the bottom wall.

In an embodiment, the bottom wall of the trickling filter is inclined, and the opening is adjacent to a lower side of the bottom wall.

In an embodiment, each of the bacteria culture modules has a cage with a receiving space therein, and the cage has bores on a bottom thereof; a plurality of culture woods are received in the receiving space of the cage; each of the culture woods has a long axis, and an end of the culture wood at the long axis touches the bottom of the cage.

In an embodiment, the cage has at least a ring.

In an embodiment, the culture woods are made of red wood.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
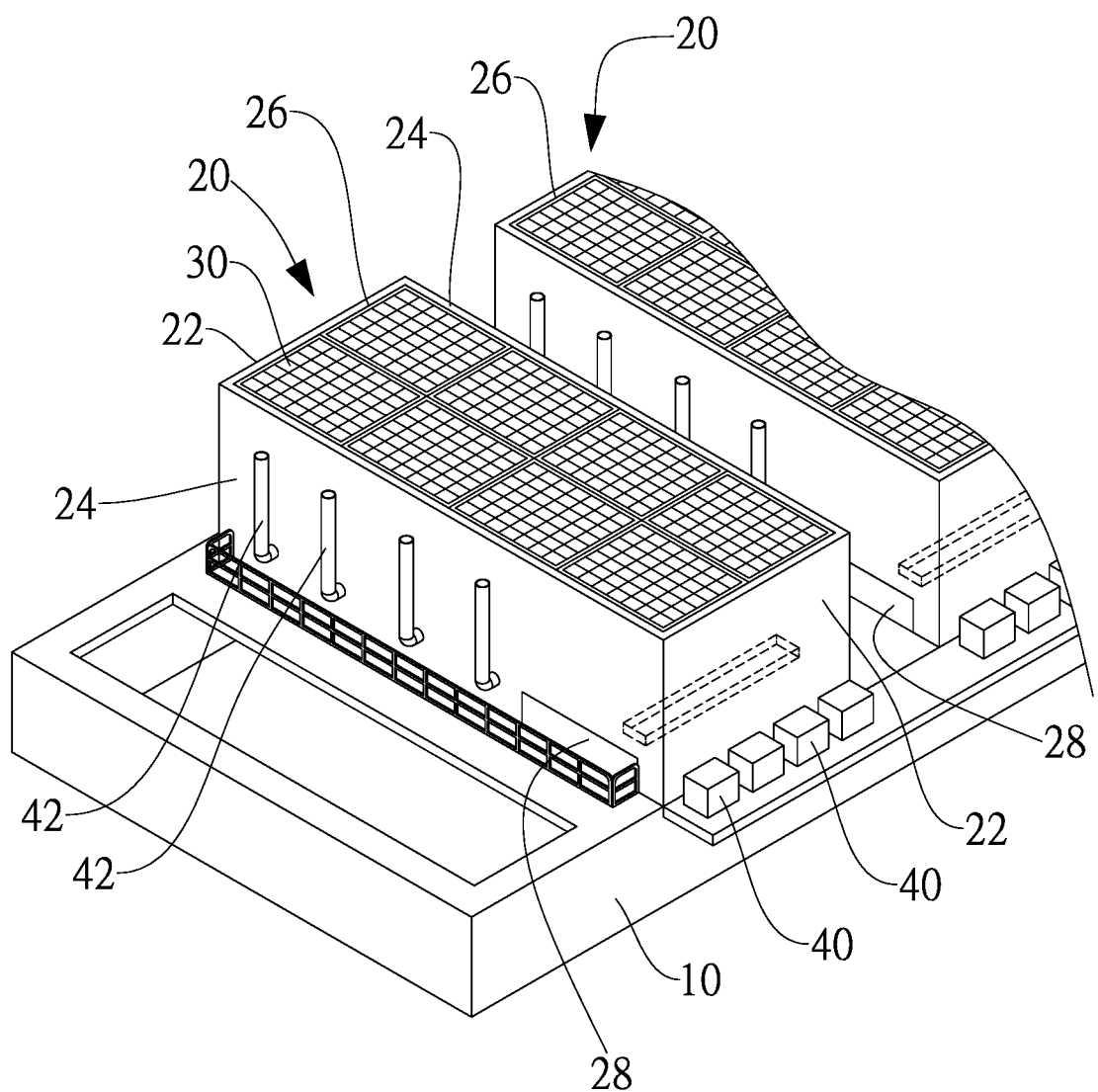
FIG. 1 is a perspective view in part of a preferred embodiment of the present invention, showing the trickling filter and the aeration tank.

As shown in FIG. 1, a wastewater treatment system of the preferred embodiment of the present invention includes an aeration tank 10 under a plurality of trickling filters 20. Wastewater flows through the trickling filters 20 and then falls into the aeration tank 10. The wastewater in the aeration tank 10 will be pumped back to the trickling filters 20 to create a circulation between the aeration tank 10 and the trickling filters 20. As a result, the wastewater is repeatedly filtered and aerated. Each of the trickling filters 20 has two first sidewalls 22 and two second sidewalls 24. Each of the trickling filters 20 is provided with an opening 29 on a bottom wall thereof for the wastewater falling into the aeration tank 10.

Figure 2:
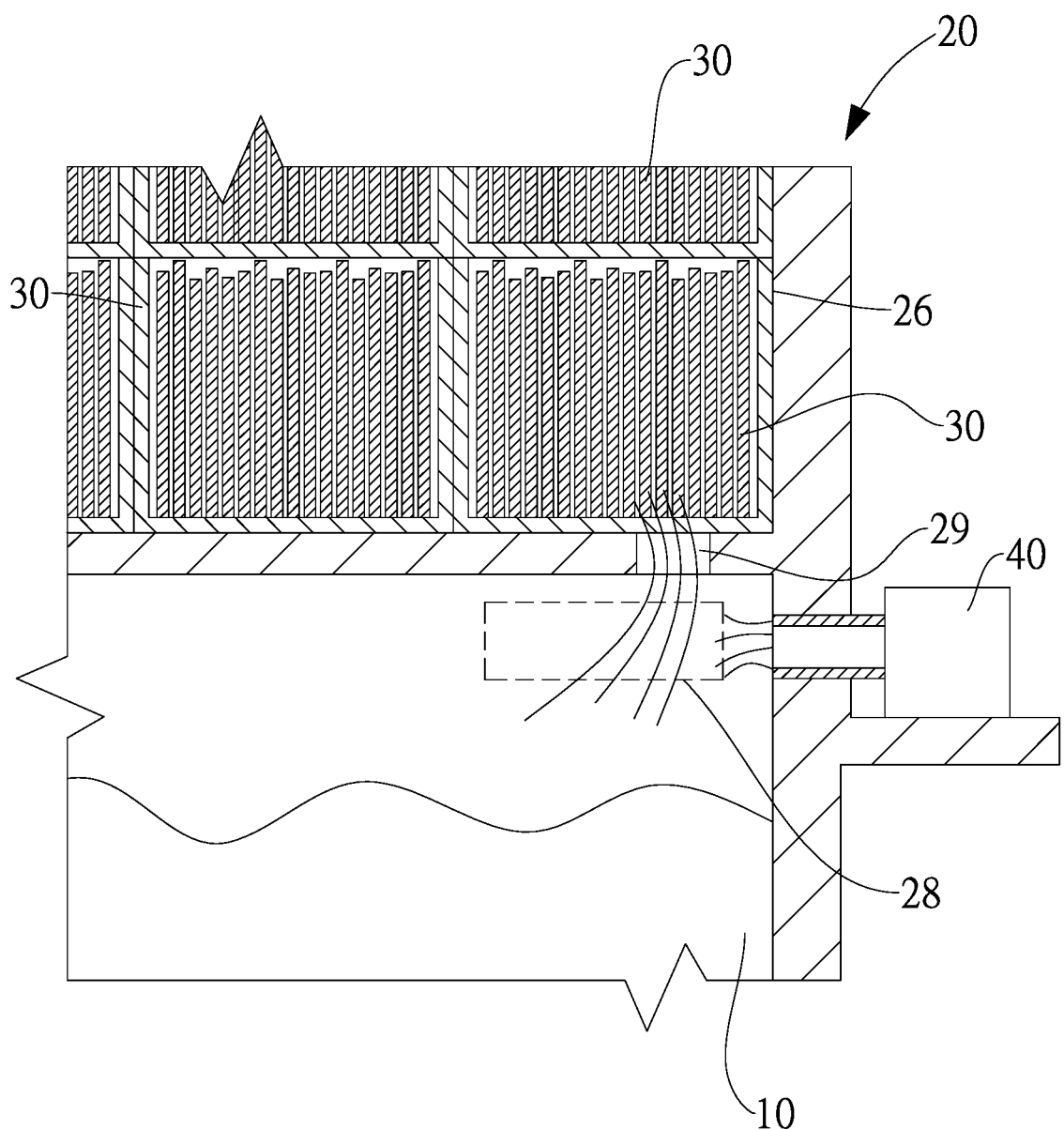
FIG. 2 is a sectional view of the trickling filter of the preferred embodiment of the present invention.
Figure 3:
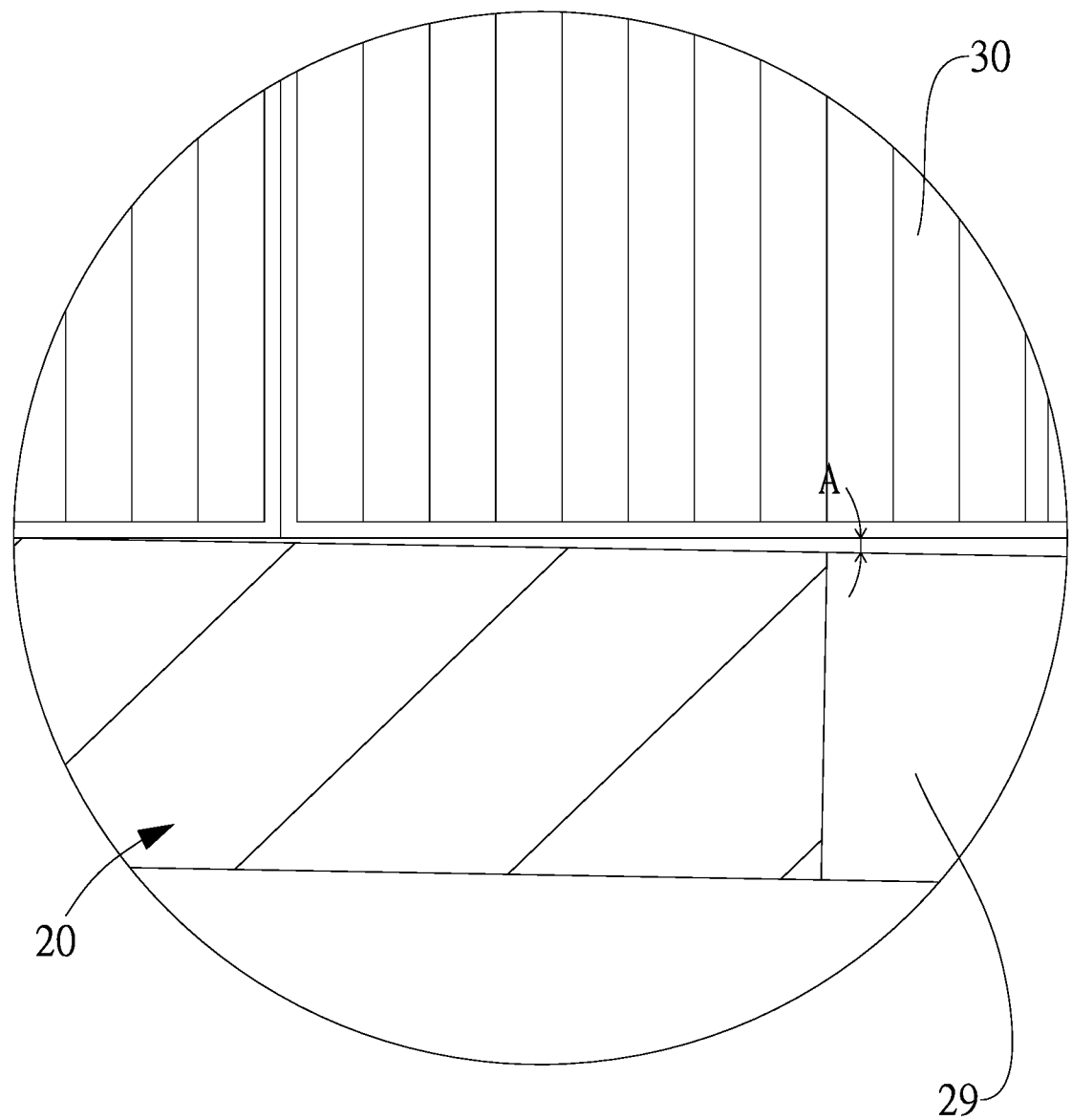
FIG. 3 is an enlarged view of the trickling filter of the preferred embodiment of the present invention.

As shown in FIGS. 1 and 2, each of the trickling filters 20 has a chamber 26 above the bottom wall, in which a plurality of bacteria culture modules 30 are received and stacked in a matrix form. Each of the trickling filters 20 is provided with a window 28 on the second sidewall 24, and the window 28 is below the bottom wall. A plurality of blower devices 40 are provided on the first sidewall 22 of each of the trickling filters 20. Each of the blower devices 40 has an output terminal, and the output terminal is below the bottom wall. A plurality of air pipes 42 are provided on the second sidewall of each of the trickling filters 20. Each of the air pipes 40 has an inlet an outlet at opposite ends, wherein the inlet is communicated with a room under the bottom wall, and air pipe 42 is bent upwards to have the outlet facing the sky.

The bottom wall of the trickling filter 20 is inclined with an inclined angle A. The opening 29 is provided at a position adjacent to lower side of the bottom wall. It is noted that the inclined angle A is small that the bacteria culture modules 30 will not slide to the lower side of the bottom wall.

Figure 4:
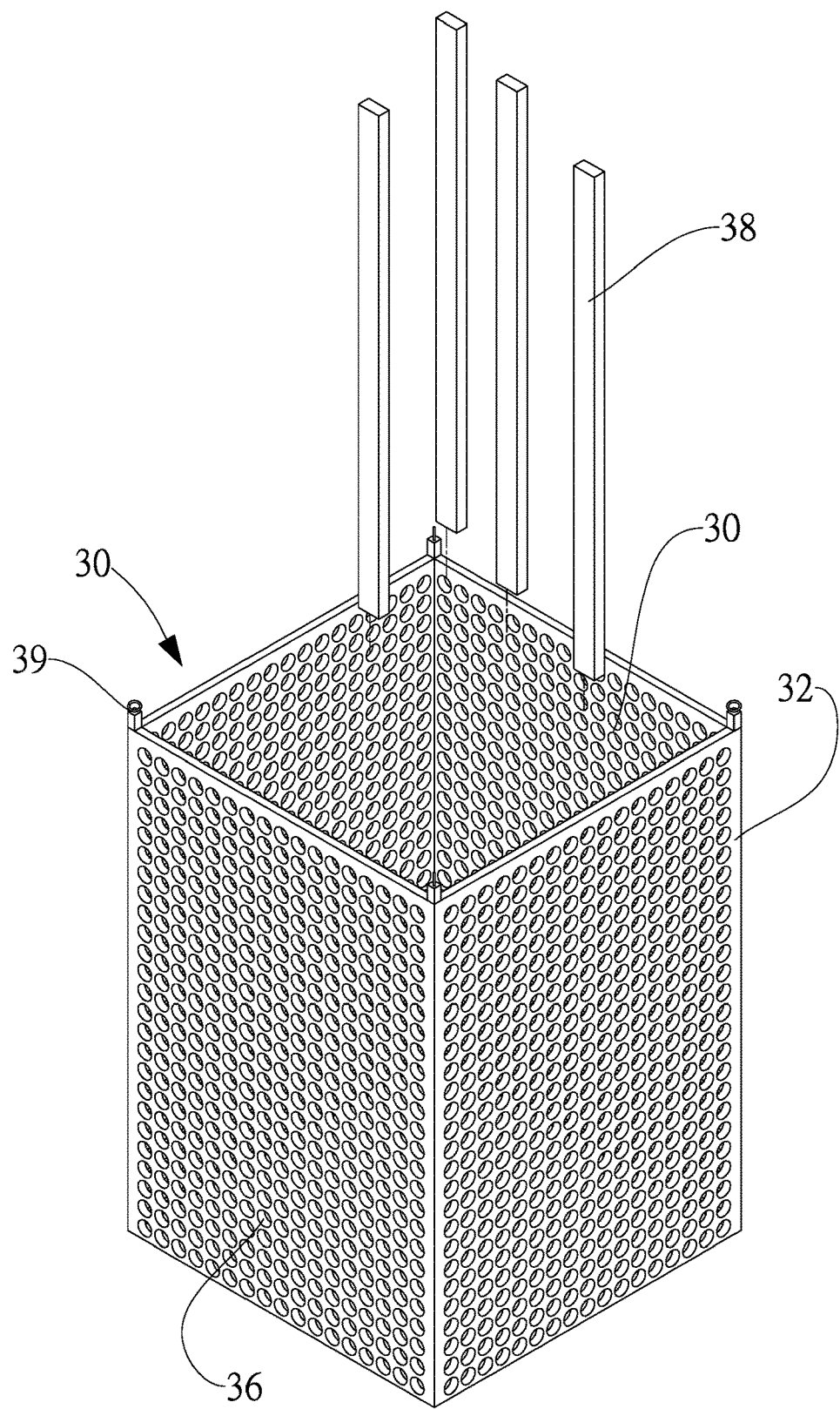
FIG. 4 is an exploded view of the bacteria culture module of the preferred embodiment of the present invention.

As shown in FIG. 4, each of the bacteria culture modules 30 has a cage 32 with a receiving space 34 therein. The cage 32 has a plurality of bores 36 on an annular sidewall and a bottom thereof. A plurality of elongated culture woods 38, each of which has a long axis. The culture woods 38 are received in the receiving space 34 of the cage 32 with an end of the long axis touching the bottom of the cage 32. The cage 32 is provided with a plurality of rings 39. The culture woods 38 are made of red wood.

Figure 5:
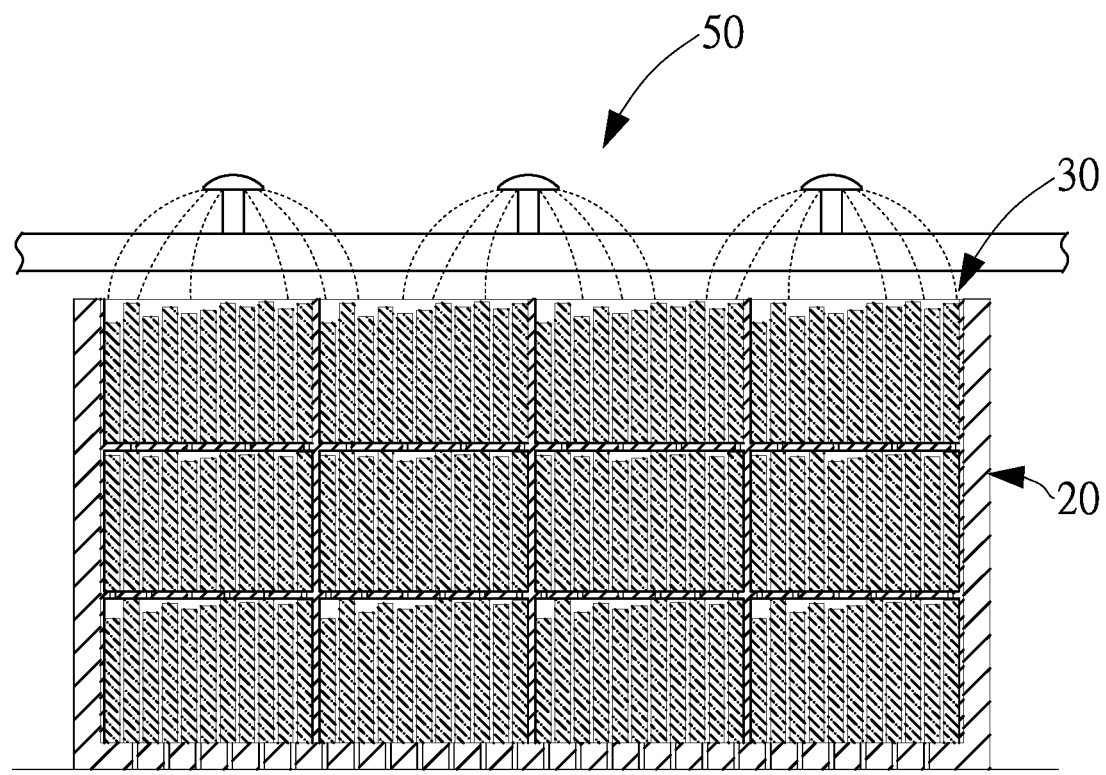
FIG. 5 is a sectional view of the bacteria culture module of the preferred embodiment of the present invention.

As shown in FIG. 5, a plurality of water spraying devices 50 are provided above the trickling filters 20 to provide the wastewater to the bacteria culture modules 30 in the trickling filters 20. The wastewater flows through the bacteria culture modules 30, and then flows to the opening 29 at the lower side of the bottom wall. As a result, the wastewater falls to the aeration tank 10 via the opening 29 like a waterfall.

As shown in FIG. 2, the blower device 40 provides airflow to the wastewater fallen from the opening 29 to cool the wastewater.

Figure 6:
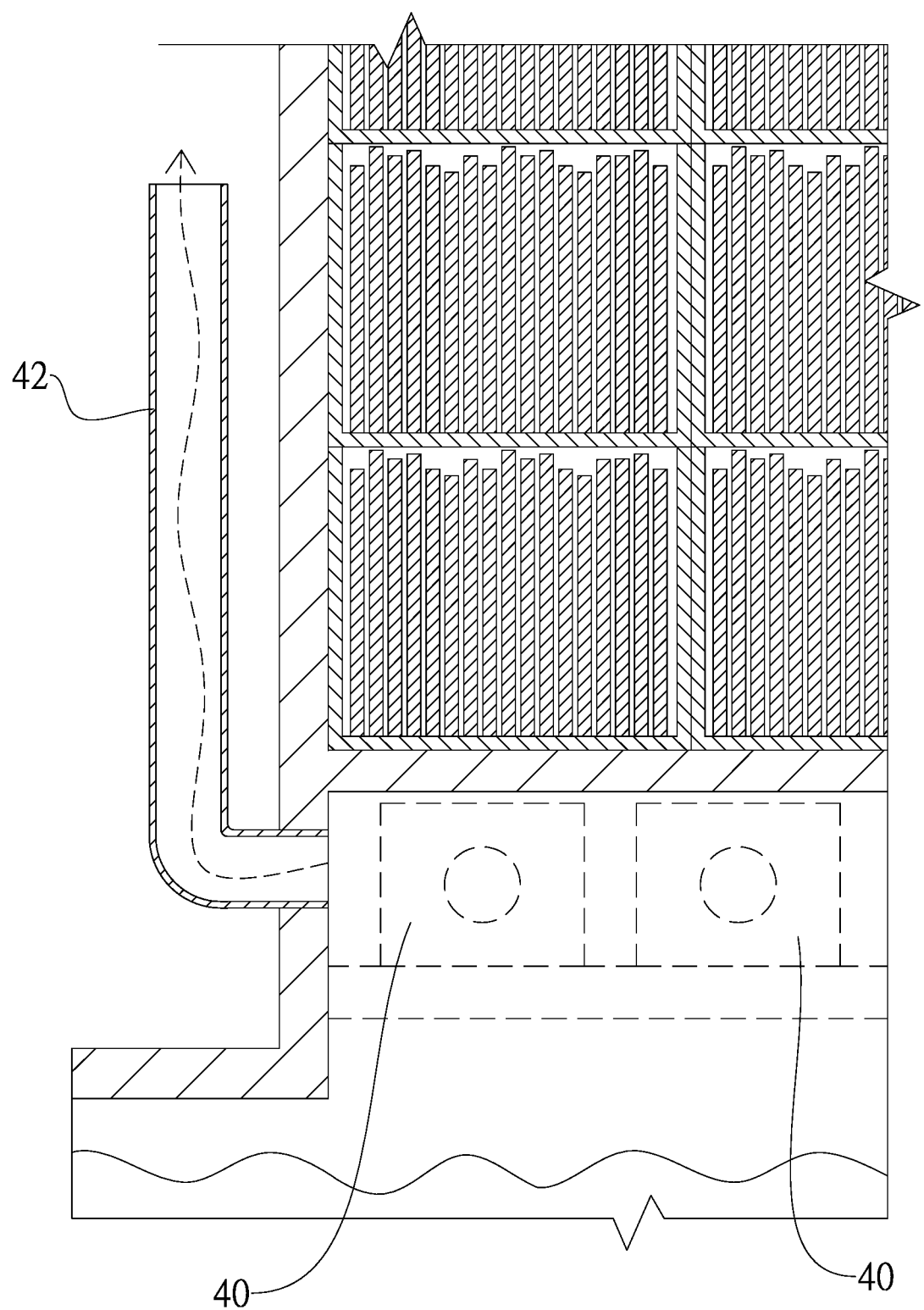
FIG. 6 is a sectional view of the preferred embodiment of the present invention, showing the airflow of the blower device.
Figure 7:
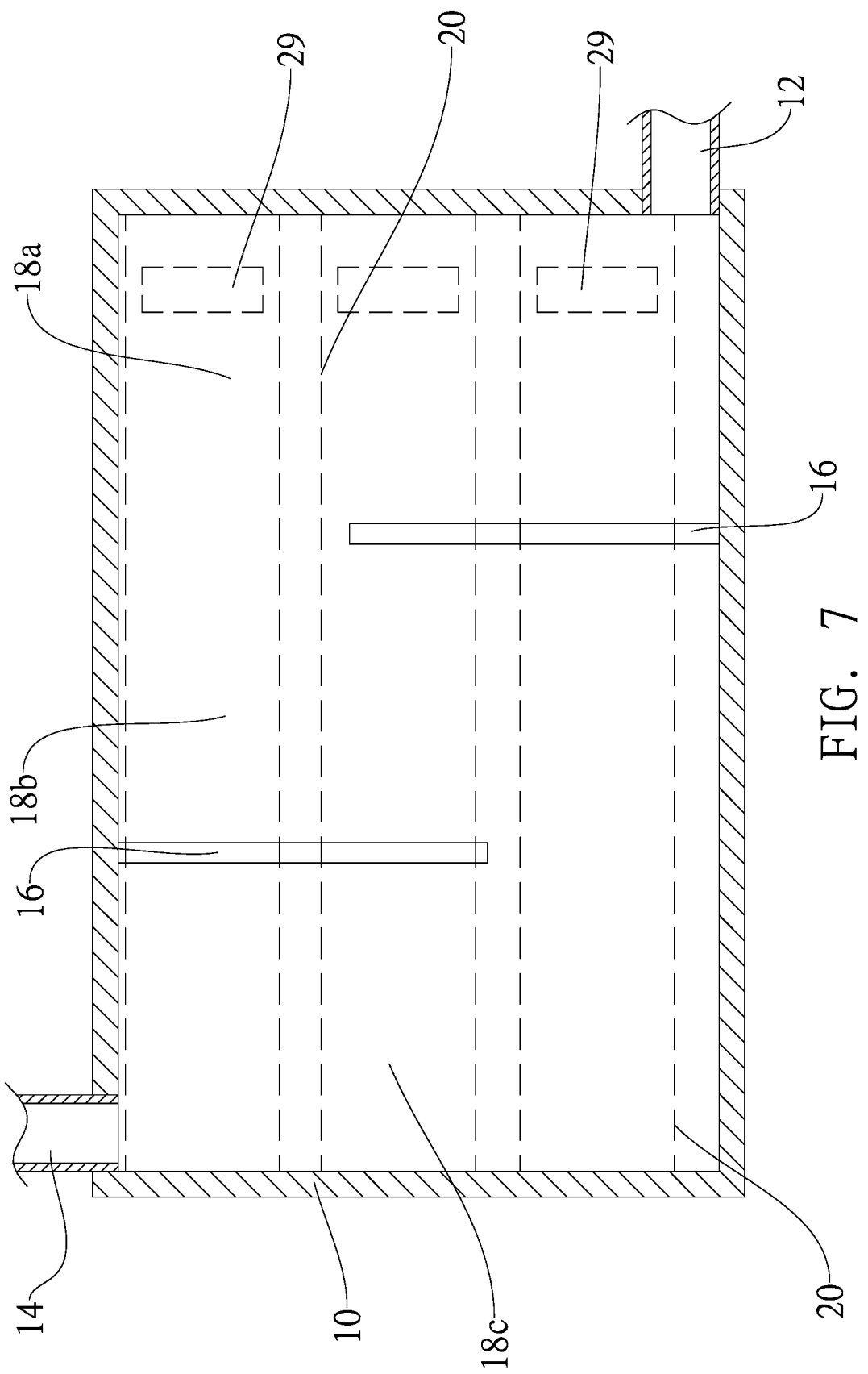
FIG. 7 is a sectional view of the aeration tank of the preferred embodiment of the present invention.

As shown in FIG. 6, the airflow of the blower device 40 is exhausted out through the air pipes 42.

The present embodiment provides the long axes of the culture woods 38 substantially parallel to a direction of a water flow when the wastewater flows through the trickling filters 20. Therefore, sludge in the wastewater is hard to be accumulated on the culture woods 38 and between the culture woods 38. It also may reduce a temperature in the trickling filters 20 to provide an environment in the trickling filters 20 good to bacteria, especially to aerobic bacteria.

The blower devices 40 and the air pipes 42 create ventilation which is helpful to reduction of the temperature of the wastewater and to the bacteria. The window 28 is adjacent to the opening 29 which may generate ventilation as well.

Therefore, the present embodiment provides the windows 28 and the blower devices 40 to reduce the temperature of the wastewater in the trickling filters 20 to provide an environment good to bacteria. The time to open and close the blower devices 40 is controllable to control the temperature of the wastewater.

The aeration tank 10 has an inlet 12 and an outlet 14. The aeration tank 10 further is provided with a plurality of walls 16 to form a continuous S-shaped passageway 18a, 18b, and 18c between the inlet 12 and the outlet 14. The inlet 12 is at one end of the continuous S-shaped passageway (the section 18a), and the outlet 14 is at the other end (the section 18c). The opening 29 of the trickling filter 20 is closed to the inlet 12 than the outlet 14 (above the section 18a), so that the wastewater will fall to the section 18a of the continuous S-shaped passageway, and then flow along the continuous S-shaped passageway to the outlet 14.

The wastewater enters the aeration tank 10 via the inlet 12, flows along the continuous S-shaped passageway 18a, 18b, and 18c to the outlet 14. The wastewater out of the outlet 14 is pumped to the water spraying devices 50 to be sprayed to the trickling filters 20. The wastewater flows through the trickling filters 20 and falls into the aeration tank 10 again via the openings 29 to create a circulation.

In conclusion, the present invention may reduce the temperature of the wastewater and increase the dissolved oxygen in the wastewater, which provides an environment good to aerobic bacteria, and the smell of the whole system is reduced accordingly.

It must be pointed out that the embodiments described above are only some preferred embodiments of the present invention. All equivalent structures which employ the concepts disclosed in this specification and the appended claims should fall within the scope of the present invention.

What is claimed is:

1. A wastewater treatment system, comprising:
a trickling filter having two first sidewalls, two second sidewalls, and a bottom wall connected to the first sidewalls and the second sidewalls, wherein a chamber is formed above the bottom wall, and the bottom wall is provided with an opening; the bottom wall of the trickling filter is inclined with an inclined angle, and the opening is adjacent to a lower side of the bottom wall;
a plurality of bacteria culture modules received in the chamber of the trickling filter;
a blower device provided on one of the first sidewalls of the trickling filter, wherein the blower device has an output terminal which is below the bottom wall of the trickling filter;
an air pipe provided on one of the second sidewalls of the trickling filter, wherein the air pipe has an inlet communicated with a room under the bottom wall; and
an aeration tank under the trickling filter;
wherein each of the bacteria culture modules has a cage with a receiving space therein, and the cage has bores on a bottom thereof; a plurality of culture woods are received in the receiving space of the cage; each of the culture woods has a long axis, and an end of the culture wood at the long axis touches the bottom of the cage;
wherein all the culture woods are pole-like members and vertically received in the cage in a matrix form.

2. The wastewater treatment system of claim 1, wherein the trickling filter is provided with a window on one of the second sidewalls and below the bottom wall.

3. The wastewater treatment system of claim 1, wherein the cage has at least a ring.

4. The wastewater treatment system of claim 1, wherein the culture woods are made of red wood.

\* \* \* \* \*